US007006677B2

(12) United States Patent
Manjeshwar et al.

(10) Patent No.: US 7,006,677 B2
(45) Date of Patent: Feb. 28, 2006

(54) SEMI-AUTOMATIC SEGMENTATION ALGORITHM FOR PET ONCOLOGY IMAGES

(75) Inventors: Ravindra Mohan Manjeshwar, Guilderland, NY (US); Harvey Ellis Cline, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 551 days.

(21) Appl. No.: 10/122,892

(22) Filed: Apr. 15, 2002

(65) Prior Publication Data

US 2003/0194119 A1 Oct. 16, 2003

(51) Int. Cl.
*G06K 9/00* (2006.01)
(52) U.S. Cl. ......................... 382/131; 328/128; 128/922
(58) Field of Classification Search ................ 382/128, 382/164, 165, 170, 171, 173, 180, 181, 199, 382/224, 225
See application file for complete search history.

(56) References Cited

U.S. PATENT DOCUMENTS

| | | | |
|---|---|---|---|
| 4,905,148 A | * | 2/1990 | Crawford ..................... 382/131 |
| 5,835,087 A | | 11/1998 | Herz |
| 6,154,560 A | | 11/2000 | Cothren et al. |
| 6,204,064 B1 | | 3/2001 | Alberts et al. |
| 6,310,967 B1 | | 10/2001 | Heine et al. |
| 6,343,936 B1 | | 2/2002 | Kaufman et al. |
| 2001/0025930 A1 | | 10/2001 | Engelhardt et al. |

OTHER PUBLICATIONS

Strum, archived website http://www.uni-koblenz.de/~lb/lb_research/research.csc3d.html; archived on Jan. 31, 2002 by the Wayback Machine at www.archive.org, pp. 1-7.*
Tolias, Y.S., et al., "Image Seg. by a Fuzzy Clustering Algorithm Using Adaptive Spatially Constrained Membership Functions", IEEE Transactions on Systems, Man and Cybernetics. Part A: Systems and Humans, IEEE Service Center, US, vol. 28, No. 3, May 1998, pp.
Sivewright, G.J, et al.,"Interactive Region & Volume Growing For Segmenting Volumes In NR and CT Images", Medical Informatica, Taylor & Francis, Basingstoke, GB., vol. 19, No. 1, 1994, pp. 71-80.
Maeda J., et al., "Fuzzy Region-growing Segmentation of Natural Images Using Local Fractal Dimension," Pattern Recognition, 1998. Proceedings, 14th Int. Conf. on Brisbane, QLD, Australia Aug. 16-20, 1998, Los Alamitos, CA, IEEE Comput. Soc, vol. 2, pp. 991-993, Sep. 1998.
Guliato, D., et al., "Segmentation of breast tumors in mammograms by fuzzy region growing," Engineering in Medicine and Biology Society, Int. Conf. IEEE, Hong Kong, China Oct. 29-Nov. 1, 1998, vol. 2, Oct. 29, 1998.
Search Report.

* cited by examiner

*Primary Examiner*—Brian Werner
*Assistant Examiner*—Christopher Lavin
(74) *Attorney, Agent, or Firm*—Jean K. Testa; Patrick K. Patnode

(57) ABSTRACT

An apparatus and method for segmenting three-dimensional (3D) medical images containing a region of interest is provided that identifies a first set of seed points within the region of interest and a second set of seed points outside the region of interest. A first sphere is constructed within the region of interest. Voxels contained within the medical image are classified using a spatial constrained fuzzy clustering algorithm. A plurality of second spheres is generated. Ones of the plurality of second spheres are accepted that satisfy the homogeneity function threshold as defined by the spatial constricted fuzzy clustering algorithm. A three-dimensional area is grown that defines the region of interest. The region of interest defined by the three-dimensional area is displayed.

16 Claims, 4 Drawing Sheets

SEMI-AUTOMATIC SEGMENTATION ALGORITHM FOR PET ONCOLOGY IMAGES

BACKGROUND OF THE INVENTION

This invention relates to segmentation of medical images. More particularly, the invention relates to a method and system for segmenting an region of interest in three-dimensional medical images for use in volumetric measurement.

It is well-known to obtain three-dimensional (3D) arrays of data representing one or more physical properties within an interior of a solid body, for example, anatomical structures. In medical imaging, such data is obtained by a variety of non-invasive methods such as positron emission tomography (PET), computed tomography (CT), magnetic resonance imaging (MRI), ultrasound, x-ray or a combination thereof. Regardless of the image data acquisition method, the 3D array of data typically consists of a plurality of sets of three-dimensional coordinates distributed at regular positions about the body of interest. There are a variety of techniques available to generate a three-dimensional model or structure. Typically, a seed voxel (volume element) is placed within the anatomical structure of interest and adjacent voxels are successively analyzed and identified as belonging to the same structure generally if they are adjacent to a previously identified voxel and they meet a specified attribute, such as intensity or radiological density. In accordance with any of the known techniques, a 3D image is obtained for visualization.

The three-dimensional (3D) visualization of internal anatomical structures is a technique by medical professionals and research scientists. Three-dimensional models enable the ability to rotate the model or virtual representation of the anatomical structure, as well as adjust a point of perspective and zoom in/out from features of interest. Additionally, volumetric measurements are enabled by a variety of known 3D image processing techniques.

Three-dimensional visualization and volume measurement is of particular interest for studying the brain, other organs and body parts. Measurements of 3D images either by registration methods or by segmentation methods are typically tedious because manual editing is required in a 3D representation. Supervised segmentation methods are not sufficiently accurate because of inter-observer error. Another technique, known as active contours, has been able to segment the medical image using a model where the surface of the active contour (bubble) moves at a velocity that depends on curvature and diffusive flow. This involves growing a bubble constrained by image parameters such as gradients and curvature and constructing a force that stops the bubble growth. However, most of the available techniques encounter some degree of error. For example, the connected volume after segmentation may include regions that are not of interest thus requiring some user intervention. Further, the connected volume may include connection through a undesired narrow region, bridge or other small structure that connects different regions that are desirably separated.

There is a desire for method and system that segments three-dimensional medical images in a semi-automatic manner with minimal user intervention.

BRIEF SUMMARY OF THE INVENTION

A method and apparatus for segmenting three-dimensional (3D) medical images containing a region of interest is provided that includes the identification of a first set of seed points within the region of interest and a second set of seed points outside the region of interest. A processor uses the identified seed points to classify all the voxels in the data set using a spatially constrained fuzzy clustering algorithm. Herein, the 3D image set is transformed into a fuzzy partition domain where each voxel is assigned a probability of belonging to the desired region of interest based on a homogeneity function. A processor constructs a set of first spheres within the region of interest centered on the first set of seed points. A plurality of second spheres is generated by the processor. Ones of the plurality of second spheres are accepted that satisfy the homogeneity function threshold as defined by the spatial constrained fuzzy clustering algorithm. A three-dimensional area defining the region of interest is adaptively grown based on the accepting of the ones of the plurality of second spheres. A radius of curvature of the spheres is determined to eliminate noise voxels on the interface between an inside of the region of interest and outside the region of interest. The region of interest defined by the adaptively growing of the three-dimensional area and selecting the radius of curvature is displayed to a human user.

DETAILED DESCRIPTION OF THE INVENTION

Figure 1:
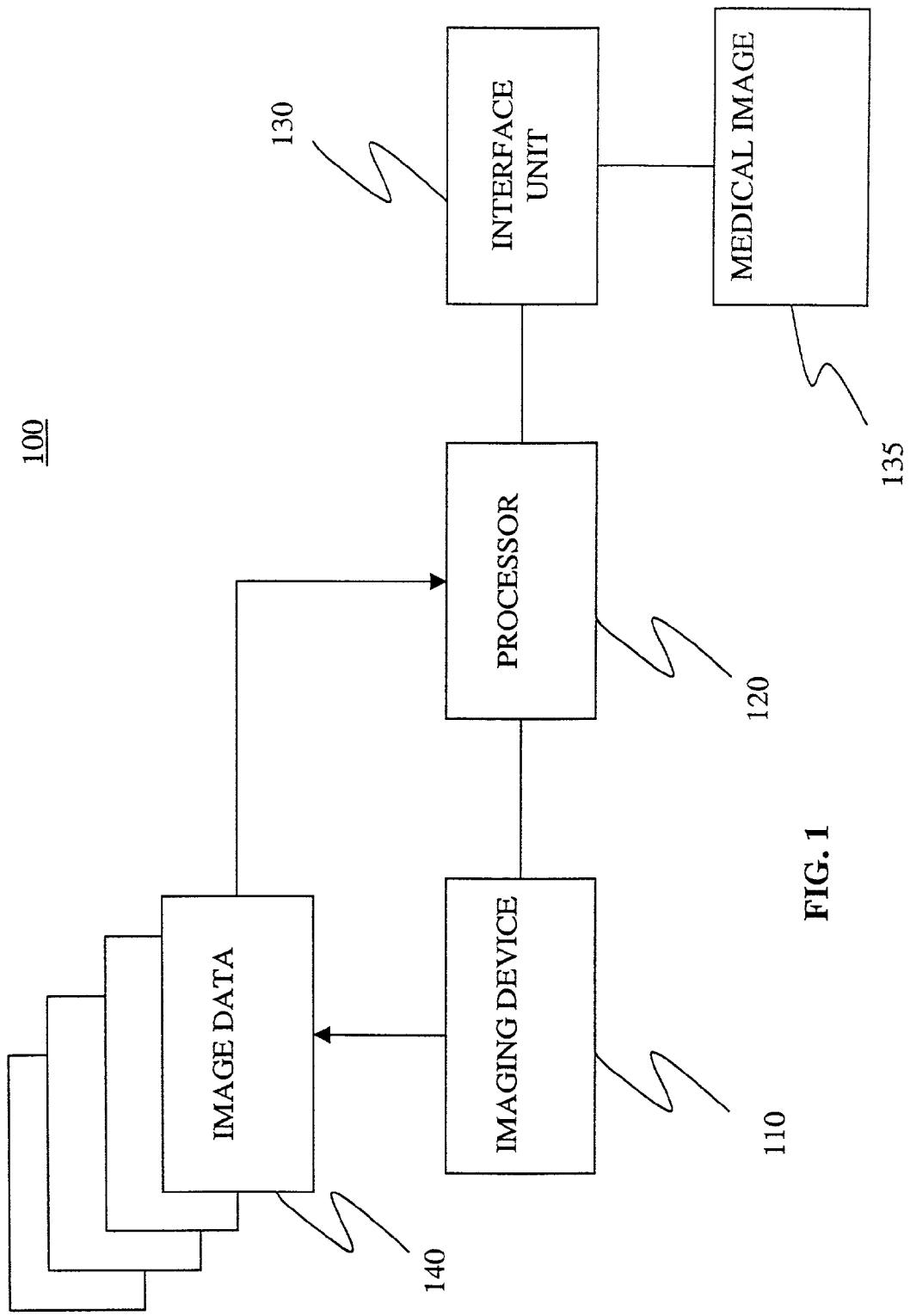
FIG. 1 is a block diagram view of a medical imaging system for use in a representative embodiment of the present invention.

Referring to FIG. 1, a block diagram of a system 100 for semi-automatic segmentation of a medical image 135. The system 100 includes an imaging device 110 that can be selected from various medical imaging devices for generating a plurality of medical images 135. In one embodiment, medical imaging techniques, such as, for example, positron emission tomography (PET) and magnetic resonance imaging (MRI) systems, are used to generate the medical images 135.

In one embodiment, during a PET imaging session, a patient is injected with a radio-labeled ligand that specifically targets metabolically hyperactive regions like tumors. The patient horizontally lies inside the scanner. Photon emissions from the decay of the radio-active ligand are detected by a series of photon detectors. The detectors measure the amount radio-active emissions from inside the patient's body. This information is used to compute the concentration of the radio-labeled ligand for sample points in the body. A gray scale image is then constructed based upon the calculated radio-ligand concentrations. The shades of gray in the image contrast the amount of radio-ligand concentration of every point within the slice. The slices obtained during a PET session can be reconstructed to provide an functionally correct representation of the area of interest within the body.

In another embodiment, during a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. Like PET image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed by various shades of gray.

Once a medical image has been obtained using a medical imaging technique, the medical images 135 are generally segmented. The segmentation process classifies the pixels or voxels of the medical image 135 into a certain number of classes that are homogeneous with respect to some characteristic (i.e. intensity, texture, etc.). For example, in a segmented medical image of the brain, the material of the brain can be categorized into three classes: gray matter, white matter, and cerebrospinal fluid. Individual colors can be used to mark regions of each class after the segmentation has been completed. Once the segmented medical image is developed, surgeons or other medical personnel can use the segmented images to plan surgical techniques and/or assist in diagnoses.

Typically, creating a segmented medical image involves several steps. A data set is created by capturing slices of data from the medical image 135. Through the segmentation process, a gray scale value is assigned to each point in the data set and different types of tissues will have different gray scale values. Each type of material in the data is assigned a specific value and, therefore, each occurrence of that material has the same gray scale value. For example, all occurrences of bone in a particular image may appear in a particular shade of light gray. This standard of coloring allows the individual viewing the image to easily understand the objects and/or regions of interest being represented in the images.

In one embodiment as further shown in FIG. 1, a medical imaging system 100 comprises a processor 120 connected to an imaging device 110 and an interface unit 130. The imaging device 110 generates a plurality of image data sets 140 and can comprise, for example, a positron emission tomography (PET) or magnetic resonance (MR) scanner. In the context of PET and/or MR, imaging system 100 acquisition of image data 140 is generally referred to as scanning. The processor 120 performs computations relating to semi-automatic segmentation of the medical image 135 as described herein. Further, the processor 120 is also performs computation and control functions for image processing techniques, such as, for example, reconstruction, image data memory storage, segmentation, etc. In one embodiment, the processor 120 comprises a central processing unit (CPU), such as, for example, a single integrated circuit and/or microprocessor. In another embodiment, the processor 120 comprises a CPU comprising, such as, for example, a plurality of integrated circuit devices and/or circuit boards working in cooperation to accomplish various functions. In even another embodiment, the processor 120 includes a memory device, such as, for example, random access memory (RAM), dynamic random access memory (DRAM), static random access memory (SRAM), flash memory, cache memory, etc. In addition, it should be appreciated that, in other embodiments, the processor 120 may internally comprise a memory device. In addition, the processor 120 executes the programs contained in memory and can act in response to those programs to perform other activities or functions that can occur in the course of image acquisition and image viewing. Also as shown in FIG. 1, the processor 120 further performs segmentation methods as described herein in relation to FIGS. 2–6 and in response to placement of seed points from, for example, interface unit 130.

As further shown in FIG. 1, the interface unit 130 is coupled to processor 120 and allows a human user to communicate with imaging system 100. Additionally, the processor 120 can perform computations that are transmitted to and/or from interface unit 130 in a manner such that a human user is capable of interpreting the transmitted information. In one embodiment, the transmitted information can include images in 2D or 3D, color and gray scale images, and text messages regarding diagnosis and detection information. In another embodiment, the interface unit 130 can comprise, for example, a personal computer, an input/output device, an image work station, a hand held image display unit or a conventional image display platform generally included as a component in a PET or MRI system.

The image data 140 gathered from multiple scans of the patient can considered one data set and can be formed into a medical image 135. Each data set can be broken up into smaller units, either pixels or voxels. When the data set is two-dimensional, the medical image 135 is made up of units called pixels. A pixel is a point in two-dimensional space that can be referenced using two-dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the medical image 135 is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

Figure 2:
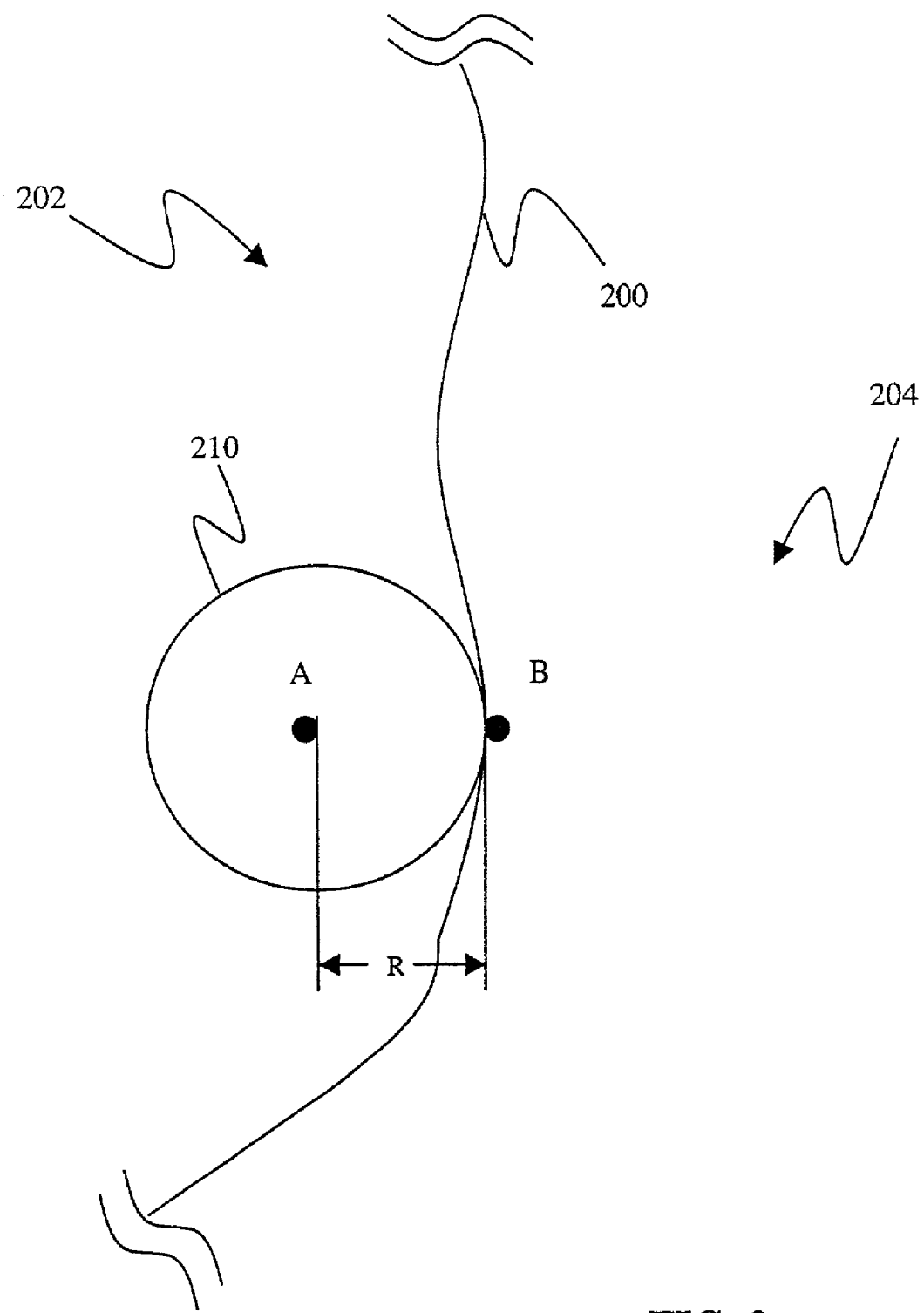
FIG. 2 is a diagrammatic view of the positioning of the seed points in relation to the generated spheres in a representative embodiment of the present invention.
Figure 3:
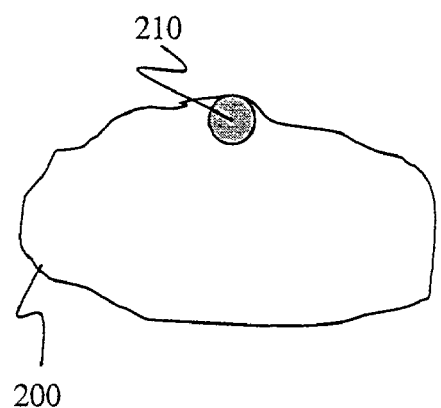
FIGS. 3–5 are diagrammatic views of a representative embodiment of processing used in semi-automatic segmentation of a medical image.
Figure 4:
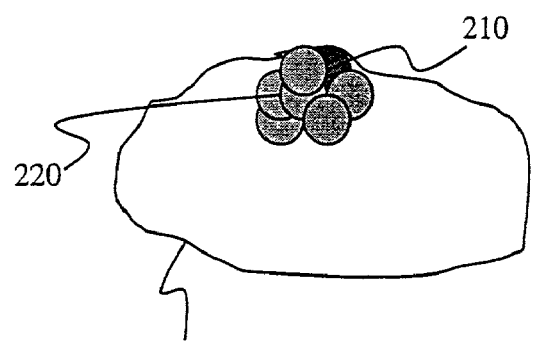
Figure 5:
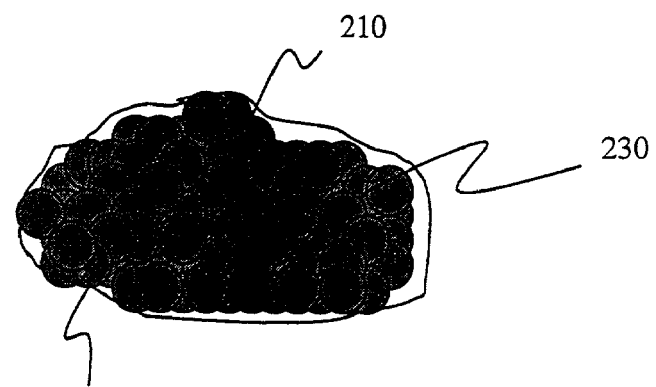
Figure 6:
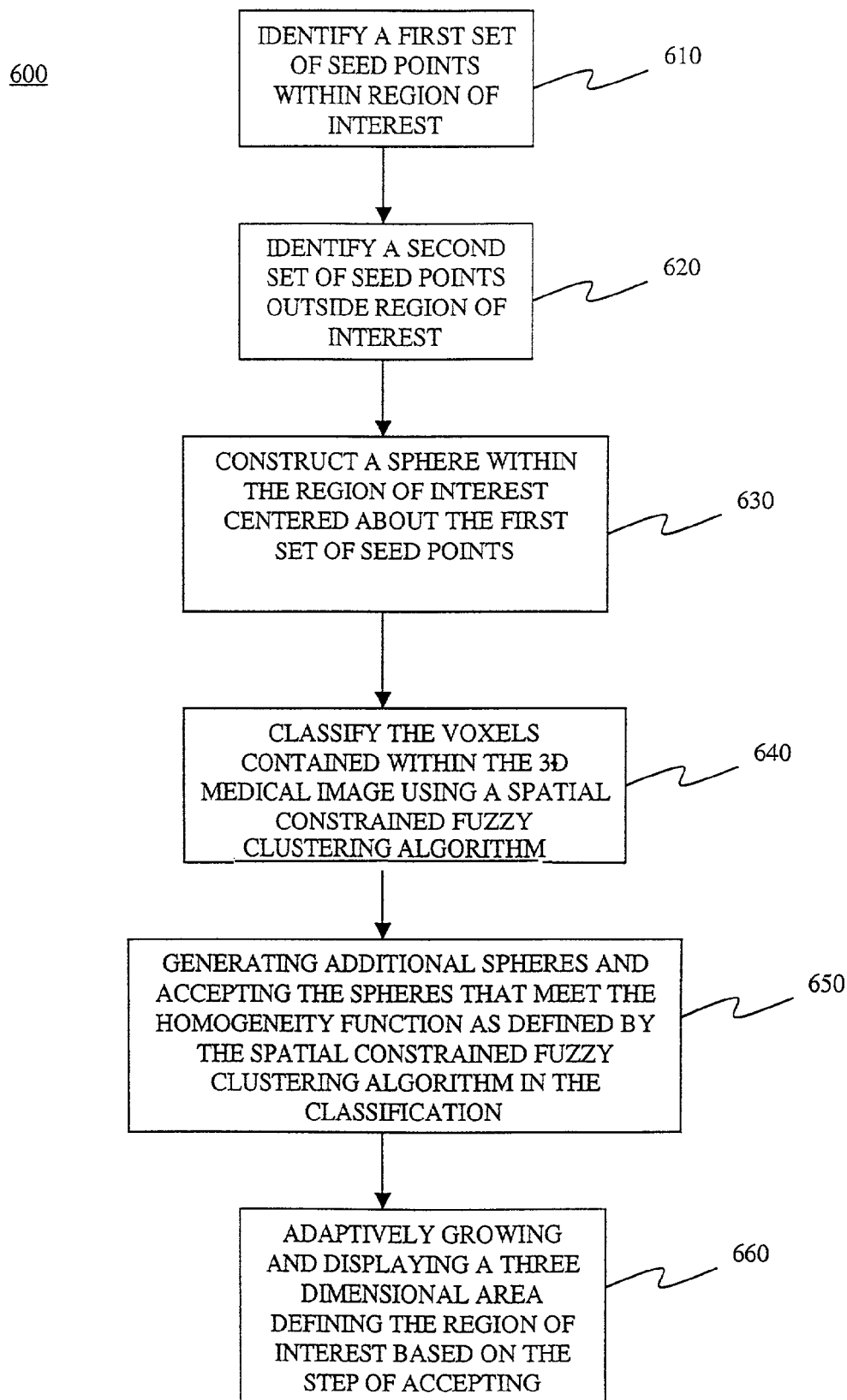
FIG. 6 is a block diagram view of a process for semi-automatic segmentation of a medical image.

In one embodiment, as shown in FIG. 6, a method 600 is provided for segmenting a three-dimensional (3D) medical image 135 that has a region of interest 200 (FIG. 2). A first set of seed points (A) is identified within the region of interest 200 (step 610). A second set of seed points (B) is identified outside the region of interest 200 (step 620). It should be appreciated that, in one embodiment, a set of seed points comprises at least one seed point. It should further be appreciated that, in another embodiment, a set of seed points can comprise a plurality of seed points. It should also be appreciated that, in one embodiment, the first set of seed points (A) and the second set of seed points (B) can be identified by a human user using the interface unit 130 of the imaging system 100. A first sphere 210 is constructed within the region of interest 200 and is centered about the first set of seed points (A) (step 630). It should be appreciated that, in one embodiment, the first sphere 210 can comprise a set of first spheres wherein each of the set is centered about a different one of the set of seed points (A). Using a spatial constrained fuzzy clustering algorithm, all the voxels contained in the 3D medical image 135 are classified as belonging to the region of interest 200 based on a homogeneity function and a homogeneity function threshold is determined (step 640). A number of second spheres 220 (FIG. 3) are generated (step 650). Only those second spheres 220 that satisfy the homogeneity function threshold as defined by the spatial constricted fuzzy clustering algorithm are accepted. In one embodiment, the homogeneity function threshold is satisfied when the homogeneity function threshold of the first sphere 210 is equal to or greater than the homogeneity function threshold of the particular one of the second spheres 220. In another embodiment, the homogeneity function threshold is satisfied when the homogeneity function threshold of the first sphere 210 is equal to or less than the homogeneity function threshold of the particular one of the second spheres 220. A three-dimensional area 230 (FIG. 5) defining the region of interest 200 is adaptively grown and/or expanded based of the accepting of the particular ones of the second spheres 220 (step 660). The region of interest 200 defined by the adaptive growing and/or expanding of the ones of the second spheres 220 is displayed to a human user (step 660). It should be appreciated that, in one embodiment, the interface unit 130 can perform the displaying of the region of interested 200.

In another embodiment as shown in FIG. 2, the apparatus and method 100 for segmenting three-dimensional medical images 135 containing an object of interest 200 includes identifying a first set of seed points (A) and a second set of seed points (B). The first set of seed points (A) is identified in an inner portion 202 of the region of interest 200. The second set of seed points (B) is located in an exterior portion 204 in relation to the region of interest 200. In this embodiment, the first set of spheres 210 is constructed completely in the inner potion 202 of the region of interest 200 and about the first set of seed points (A). In even another embodiment, the number of second spheres 220 is generated about the first sphere 210.

As discussed above and shown in FIGS. 3–5, the voxels contained in the 3D image 135 are classified with a particular homogeneity function as defined by the spatial constricted fuzzy clustering algorithm. In one embodiment, the spatial constricted fuzzy clustering algorithm models the inherent high inter-pixel correlation between neighboring voxels and the fuzzy edges due to inherent low resolution properties of the medical image 135. The voxels contained in each one of the second spheres 220 is tested against the homogeneity function threshold. Those second spheres 220 that satisfy the homogeneity function threshold are accepted, and those second spheres 220 that do not satisfy the homogeneity function threshold are not accepted. The second spheres 220 that are accepted grow, expand and define a three-dimensional area 230 that defines the region of interest 200. Therefore, it should be appreciated that by this semi-automatic segmentation the growth, expansion and definition of the three-dimensional area 230 of the region of interest 210 is performed using a fuzzy partition domain map of the medical image rather than the native pixel/voxel intensity domain.

In one exemplary embodiment, the images are three-dimensional medical images 135 acquired by magnetic resonance imaging (MRI). However, it is to be appreciated that the three-dimensional medical images may be acquired by techniques other imaging systems such as, for example, computed tomography (CT), positron emission tomography (PET), and x-ray systems. In another embodiment, the imaging system 100 can comprise a PET system and the medical images 135 can comprise oncology images.

In a further embodiment, the method 100 and apparatus for segmenting the medical image 135 a radius of curvature (R) (FIG. 2) of the first sphere 210 and the second spheres 220 is selected. The radius of curvature (R) and the morphological opening is used to eliminate noise voxels on the interface between an inner potion 202 and an outer portion 204 of the region of interest 200 and, in addition, increase the robustness against noise. In addition, the selection of the radius of curvature (R) prevents the joining of objects connected by thin paths or the inclusion of noise areas on the surface and/or interface (area demarking the inner portion 202 and the outside potion 204) of the region of interest 200. It should be appreciated that, in one embodiment, the radius of curvature (R) can be determined by the imaging system 100. In addition, it should also be appreciate that, in another embodiment, that the radius of curvature (R) of the spheres can selected in accordance with a predetermined radius of curvature (R) of the segmented representation.

In even another embodiment, the medical images 135 can comprise three-dimensional brain images acquired by magnetic resonance imaging (MRI). It should also be appreciated that, in other embodiments, the three-dimensional medical images 135 may be acquired techniques other imaging techniques, such as, for example computed tomography (CT), positron emission tomography (PET), and x-ray systems. Generally, three-dimensional magnetic brain images 135 can be segmented by connectivity using the methods described above. However, in the three-dimensional magnetic brain images 135, there may be connections between the intracranial volume and the scalp that should also be segmented. For example, one path that connects the brain to the scalp is along the optic nerve to the fluid filled eye globes and then the facial tissue. In this embodiment, one or more seeds in placed in the object (in this embodiment, the brain) and wavelets of a fixed spherical radius are formed. As used herein a "wavelet" refers to a data structure representing the voxels contained within a sphere. The radius of the wavelet is selected by the user to prevent connectivity along narrow paths. The wavelets are tested and only those spherical regions completely composed of voxels above a critical threshold are allowed to propagate. In one embodiment, the critical threshold comprises the homogeneity function threshold. In addition, the threshold refers to a parameter defining the region of interest 200 and is generally based on intensity values. In one embodiment, the threshold is selected to define the region of interest 200 such that the voxels within the region of interest 200 are above the threshold and the remaining voxels are considered background. The threshold alone is generally not sufficient for segmentation because other objects may also have an intensity value above the threshold. For example, the brain and scalp have similarly high relative intensity compared to other voxels. Further in this embodiment, at the boundary of a growing bubble, there are active spherical wavelets with active seeds at the center. The bubble is composed of the region swept out by the wavelets. After each iteration, a layer of wavelets propagate in until there are no more active seeds. The union of all the spherical regions (wavelets) that are completely above the threshold define the connected volume (bubble). It is to be noted that regions that form bridges smaller in dimension than the selected bubble diameter are not included in the connected region. Further, the connected volume does not propagate into noisy regions where the voxels above threshold are randomly selected.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for segmenting three-dimensional (3D) medical images containing a region of interest, the method comprising the steps of:
   identifying a first set of seed points within the region of interest;
   identifying a second set of seed points outside the region of interest;
   constructing a first sphere within the region of interest centered around the first set of seed points;
   classifying voxels contained within 3D medical images using a spatial constrained fuzzy clustering algorithm whereby transforming the voxels contained within the 3D medical image into a fuzzy partition domain based on a homogeneity function;
   successively generating a plurality of second spheres about said first sphere;
   accepting ones of the plurality of second spheres that satisfy the homogeneity function threshold as defined by the spatial constricted fuzzy clustering algorithm;
   adaptively growing a three-dimensional area defining the region of interest based on the step of accepting; and
   displaying the region of interest defined by the step of adaptively growing.

2. The method of claim 1 wherein the three-dimensional images are acquired by at least one of magnetic resonance imaging (MRI), computed tomography (CT), positron emission tomography (PET), and x-ray systems.

3. The method of claim 1 further comprising the step of selecting a radius of curvature of the first sphere and the plurality of second spheres to eliminate noise voxels on the interface between an inside of the region of interest and outside the region of interest.

4. The method of claim 1 wherein the first spheres and the plurality of second spheres have a selected radius based on a predetermined radius of curvature.

5. A method for segmenting three-dimensional (3D) medical images containing a region of interest, the method comprising the steps of:
   identifying a first set of seed points within the region of interest;
   identifying a second set of seed points outside the region of interest;
   constructing a first sphere within the region of interest centered around the first set of seed points.
   classifying voxels contained within 3D medical images using a spatial constrained fuzzy clustering algorithm whereby transforming the voxels contained within the 3D medical image into a fuzzy partition domain based on a homogeneity function;
   successively generating a plurality of second spheres about said first sphere;
   accepting ones of the plurality of second spheres that satisfy the homogeneity function threshold as defined by the spatial constrained fuzzy clustering algorithm;
   adaptively growing a three-dimensional area defining the region of interest based on the step of accepting;
   selecting a radius of curvature of the first sphere and the plurality of second spheres to eliminate noise voxels on the interface between an inside of the region of interest and outside the region of interest; and
   displaying the region of interest defined by the steps of adaptively growing and selecting the radius of curvature.

6. The method of claim 5 wherein the three-dimensional (3D) images are acquired by at least one of magnetic resonance imaging (MRI), computed tomography (CT), positron emission tomography (PET), and x-ray systems.

7. The method of claim 5 wherein the first sphere and the plurality of second spheres have a selected radius based on a predetermined radius of curvature.

8. A system for segmenting a medical image containing a region of interest and acquired by an image acquisition device, the system comprising:
   a processor coupled to the image acquisition device, the processor computing segmentation of the medical image wherein the computation of segmentation comprises the steps of:
   classifying voxels contained within the medical image using a spatial constrained fuzzy clustering algorithm as having a homogeneity function whereby transforming the voxels contained within the medical image to a fuzzy partition domain;
   constructing a first sphere within the region of interest wherein the first sphere is centered about a first set of seed points;
   successively generating a plurality of second spheres about said first sphere;
   accepting ones of the plurality of second spheres that satisfy the homogeneity function threshold as defined by the spatial constrained fuzzy clustering algorithm;
   adaptively growing a three-dimensional area defining the region of interest based on the step of accepting; and
   displaying the region of interest defined by the steps of adaptively growing; and
   an interface unit coupled to the processor for interpreting information relating to the segmentation of the medical image.

9. The system of claim 8 wherein the processor determines a radius of curvature of the first sphere and the plurality of second spheres to eliminate noise voxels on the interface between an inside of the region of interest and outside the region of interest.

10. The system of claim 8 wherein the interface unit receives first and second seed point data from a user of the system.

11. The system of claim 8 wherein the first sphere and the plurality of second spheres have a selected radius based on a predetermined radius of curvature.

12. The system of claim 8 wherein the image acquisition device is at least one of magnetic resonance imaging (MRI), computed tomography (CT), positron emission tomography (PET), and x-ray systems.

13. A system for segmenting medical images containing a region of interest and acquired by an image acquisition device, the system comprising:

a processor coupled to the image acquisition device, the processor computing segmentation of the medical image wherein the computation of segmentation comprises the steps of:

constructing a first sphere within the region of interest wherein the first sphere is centered about a first set of seed points; classifying voxels contained within the medical image using a spatial constrained fuzzy clustering algorithm as having a homogeneity function whereby transforming the voxels contained within the medical image to a fuzzy partition domain;

successively generating a plurality of second spheres about said first sphere;

accepting ones of the plurality of second spheres that satisfy the homogeneity function threshold as defined by the spatial constrained fuzzy clustering algorithm;

adaptively growing a three-dimensional area defining the region of interest based on the step of accepting;

determining a radius of curvature of the first sphere and the plurality of second spheres to eliminate noise voxels on the interface between an inside of the region of interest and outside the region of interest; and displaying the region of interest defined by the steps of adaptively growing and selecting the radius of curvature;

an interface unit coupled to the processor for interpreting information relating to the segmentation of the medical image.

14. The system of claim 13 wherein the interface unit receives first and second seed point data from a user of the system.

15. The system of claim 13 wherein the first sphere and the plurality of second spheres have a selected radius based on a predetermined radius of curvature.

16. The system of claim 13 wherein the image acquisition device is at least one of magnetic resonance imaging (MRI), computed tomography (CT), positron emission tomography (PET), and x-ray systems.

* * * * *